(12) United States Patent
Bauer et al.

(10) Patent No.: US 6,690,788 B1
(45) Date of Patent: Feb. 10, 2004

(54) INTEGRATED WORK MANAGEMENT ENGINE FOR CUSTOMER CARE IN A COMMUNICATION SYSTEM

(75) Inventors: David L. Bauer, Cherry Hills Village, CO (US); Keith R. McFarlane, Pleasanton, CA (US); Andrew Derek Flockhart, Thornton, CO (US); Lucinda M. Sanders, Boulder, CO (US); Gary S. King, Broomfield, CO (US); Darryl J. Maxwell, Lafayette, CO (US); Steve R. Russell, Sausalito, CA (US); Robert Alan Stewart, Oakland, CA (US); Wendy S. Cook, Oakland, CA (US)

(73) Assignee: Avaya Inc., Basking Ridge, NJ (US)

( * ) Notice: Subject to any disclaimer, the term of this patent is extended or adjusted under 35 U.S.C. 154(b) by 610 days.

(21) Appl. No.: 09/662,294

(22) Filed: Sep. 15, 2000

Related U.S. Application Data (63) Continuation-in-part of application No. 09/089,788, filed on Jun. 3, 1998, now Pat. No. 6,233,332.

(51) Int. Cl.[7] .......................... H04M 3/00; H04M 5/00; G06F 9/00; G06F 15/16
(52) U.S. Cl. .................. 379/242; 379/265.09; 709/100; 709/201
(58) Field of Search ................................ 379/242, 243, 379/265.02, 265.09, 266.08, 309, 265.12, 142.09; 709/100, 101, 201, 202, 223, 310, 104, 226

(56) References Cited

U.S. PATENT DOCUMENTS

| | | | | |
|---|---|---|---|---|
| 5,555,299 A | | 9/1996 | Maloney et al. | |
| 5,796,791 A | * | 8/1998 | Polcyn | 379/265.09 |
| 5,822,416 A | | 10/1998 | Goodacre et al. | |
| 5,825,869 A | * | 10/1998 | Brooks et al. | 379/265.12 |
| 5,901,209 A | * | 5/1999 | Tannenbaum et al. | 379/142.09 |
| 6,233,332 B1 | * | 5/2001 | Anderson et al. | 379/265.09 |
| 6,332,154 B2 | * | 12/2001 | Beck et al. | 709/204 |

FOREIGN PATENT DOCUMENTS

| EP | 0 897 238 A1 | 2/1999 |
|---|---|---|
| WO | WO 99/41720 A1 | 8/1999 |

* cited by examiner

Primary Examiner—Benny Tieu
(74) Attorney, Agent, or Firm—Patton Boggs LLP (57) ABSTRACT

The present integrated work management engine for customer care orchestrates all forms of work relating to the servicing of customer requests across the entire business enterprise. This integrated work management engine brings together all types of disparate communication system components, applications and information storage systems so the business which provides the customer care via these systems can respond to their customer requests in a unified, efficient and effective manner. The integrated work management engine also integrates the real time operation of the front office customer communications and the batch data processing mode of the back office. The integrated work management engine accepts work through multiple access channels, where each work request is automatically mapped to a process flow that specifies the task associated with the handling of the particular work item. The integrated work management engine uses resource selection algorithms to select the customer agent who is best equipped to handle the next step of the work request where customer data is accessed, and customer case files are updated through the fulfillment process. The selected customer agent views the customer information, process information, forms, and performance statistics on their desktop terminal device through an API set that is tightly coupled to the integrated work management engine.

24 Claims, 4 Drawing Sheets

INTEGRATED WORK MANAGEMENT ENGINE FOR CUSTOMER CARE IN A COMMUNICATION SYSTEM

CROSS-REFERENCE TO RELATED APPLICATIONS

This invention is a continuation-in-part of U.S. patent application Ser. No. 09/089,788 filed Jun. 3, 1998 now U.S. Pat. No. 6,233,332 titled "System For Context Based Media Independent Communications Processing."

FIELD OF THE INVENTION

This invention relates to a communication system that provides customer care and, in particular, to the provision of an integrated work management engine component of the communication system to orchestrate all forms of work relating to the servicing of customer requests.

PROBLEM

It is a problem in customer service scenarios, such as a call center system, that these systems are architected in a manner to minimize the cost of providing the offered services pursuant to some predefined level of responsiveness to customers' requests. The call center systems typically provide a pool of customer service representatives (termed "agents" herein), who have various skill levels, to provide the customer with a substantially appropriate response to their inquiry (also termed a "contact" herein). The agents are managed by a call center administrator who manually generates metrics representative of various agent performance factors, including but not limited to: speed of processing the request, competence in providing the customer with appropriate data, knowledge of the subject matter, and the like.

Call center call routing systems use these metrics to interconnect a customer with an available agent who is determined to have the skills to most efficiently process the contact. The definition of these metrics and the efficiency measure are highly subjective and typically fail to recognize many other factors that are relevant to the processing of an incoming contact.

A further problem is the presence of multiple forms of media communications in customer service scenarios, such as a call center, where many existing information access systems are architected for voice-only access and in a manner to minimize the cost of providing the offered services pursuant to some predefined level of responsiveness to customers' requests. For example, a call center comprises an automated call management system where customers can access information regarding products and services that are offered by the call center operator. The call center is generally staffed by a number of agents who answer queries from the customers, provide information, and take customer orders. In order to increase the efficiency of operation of the call centers, these systems are architected to force a customer's incoming call down a predefined path through an immutable response hierarchy. While this reduces the cost of providing the agents and yet provides a modicum of service to the customers, these call center systems are limited in their ability to truly serve each particular customer's needs. In particular, the incoming call is queued as a function of the type of media, thereby requiring the implementation of multiple disjunct queues, each having different call management parameters and customer wait times. Furthermore, the call connection to a particular agent represents a localized transaction that cannot easily be forwarded to another agent during the processing of the call connection while retaining the call context. For example, the order entry agent cannot easily forward any information regarding the customer if the call is transferred to another agent and the customer must again provide the information requested by the original agent. This process is frustrating to both the agent and the customer. In addition, the call center operator may have extensive information regarding the customer, their existing orders, past orders, preferences, account balance, and the like, but this information is distributed over numerous databases within the organization and cannot easily be used to enhance the level of services provided in the processing of the customer's next incoming call.

In summary, existing communications systems are lacking in their simplicity of use and ability to integrate the numerous (and growing in number) disjunct information systems that are in use in commerce.

SOLUTION

The above described problems are solved and a technical advance achieved by the present integrated work management engine for customer care which orchestrates all forms of work (voice calls, E-Mail, fax, image, web forms, and the like) relating to the servicing of customer requests across the entire business enterprise. This integrated work management engine brings together all types of disparate communication system components, applications and information storage systems so the business which provides the customer care via these systems can respond to their customer requests in a unified, repeatable, efficient and effective manner. The integrated work management engine also integrates the real time operation of the front office customer communications and the batch data processing mode of the back office. This architecture facilitates the parallel processing of tasks and enables the back office components to perform data mining tasks to manage the interactive pieces of the customer relationship in a more efficient manner.

The integrated work management engine accepts work through multiple access channels, where the channel can accept a work request in the form of voice calls, E-mail, fax, image, web forms, and the like. Each work request arriving on a channel is automatically mapped to a process flow that specifies the task associated with the handling of the particular work item. The integrated work management engine uses resource selection algorithms to select the customer agent who is best equipped to handle the next step of the work request where customer data is accessed, and customer case files are updated through the fulfillment process. The selected customer agent views the customer information, process information, forms, and performance statistics on their desktop terminal device through an API set that is tightly coupled to the integrated work management engine. Thus, the system manages all of the work for the enterprise related to customer care. The system also provides management and reporting of the agent activity and performance, as well as on the full customer experience and context.

DETAILED DESCRIPTION

The present integrated work management engine for customer care orchestrates all forms of work (voice calls, E-Mail, fax, image, web forms, and the like) relating to the servicing of customer requests across the entire communication system enterprise. This integrated work management engine brings together all types of disparate communication system components, applications and information storage systems so the business which provides the customer care via the communication system can respond to their customer requests in a unified, efficient and effective manner. A customer care center application is used herein as an exemplary application of the integrated work management engine.

Customer Care Center Architecture

Figure 1:
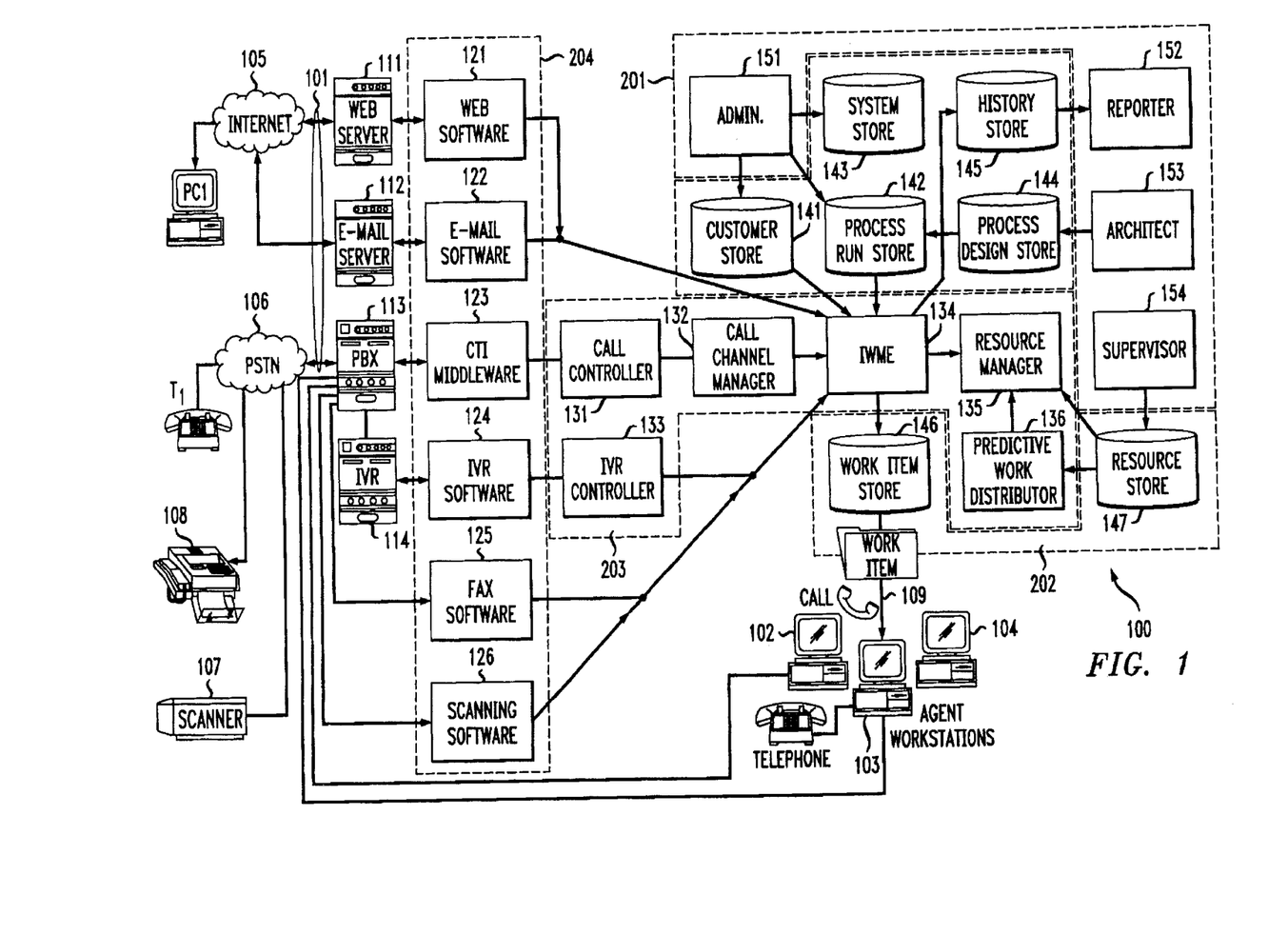
FIG. 1 illustrates in block diagram form the overall architecture of one embodiment of an intelligent work distribution architecture using the present integrated work management engine.
Figure 2:
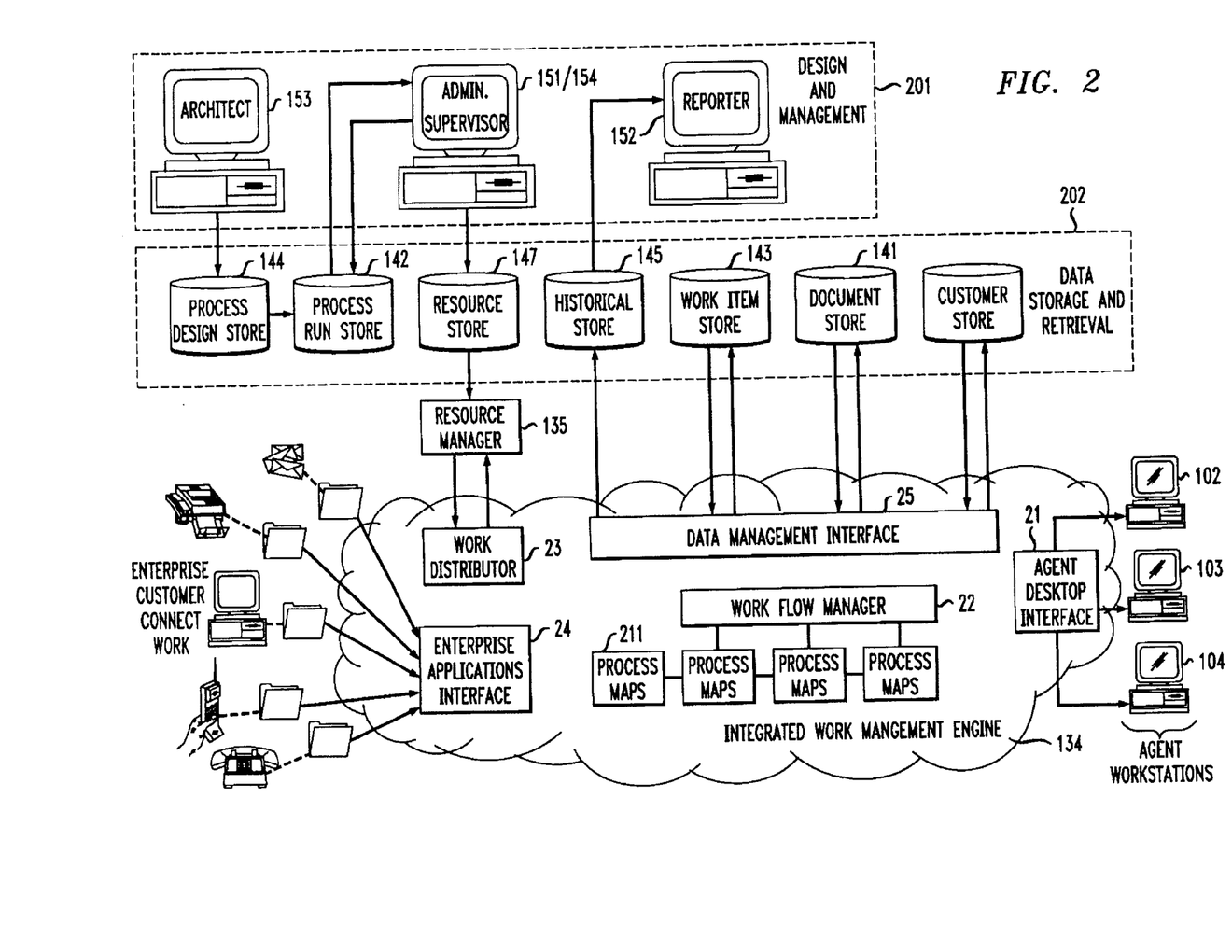
FIG. 2 illustrates in block diagram form the functional architecture of the intelligent work distribution architecture illustrated in FIG. 1 using the present integrated work management engine.

FIG. 1 illustrates in block diagram form the overall architecture of one embodiment of an intelligent work distribution architecture using the present integrated work management engine in the form of a customer care center while FIG. 2 illustrates in block diagram form the functional architecture of the intelligent work distribution architecture illustrated in FIG. 1.

The customer care center 100 selectively interconnects a plurality of telephone lines and/or trunks and/or Internet connections 101 with a plurality of agent positions 102–104. Each agent position 102–104 comprises a voice and data terminal for use by a corresponding agent in handling incoming calls. Agent positions 102–104 are connected to customer care center 100 by a voice and data medium 109. The customer care center 100 typically utilizes a switched communication system, such as the Lucent Technologies Definity® Private Branch Exchange (PBX)-based call center. This system is a stored program controlled system that includes interfaces to external communication links, a communications switching fabric, service circuits, memory for storing control programs and data, and a processor for executing the stored control programs to control the interfaces and the switching fabric and to provide the call center functionality. However, the use of such a call center system in this description is not intended to limit the applicability of the present system for automatically routing calls to call center agents, to other call centers, and other communication systems, since the applicability of the concepts disclosed herein are not limited to the particular application disclosed herein.

The customer care center 100 functions to selectively interconnect the plurality of customers with the information and services that are provided by the customer care center 100. To accomplish this function, the incoming call from a customer must be routed in an appropriate and efficient manner through the customer care center architecture which comprises a hierarchically organized set of facilities and services. There are a plurality of communication modes that can be used by a customer and a number of the most commonly used ones are illustrated in FIG. 1. In particular, the customer can initiate a circuit switched voice communication connection to the customer care center 100 via the Public Switched Telephone Network (or via an IP voice connection) to the switching fabric of PBX 113 of customer care center 100 for routing to an agent position 102–104 via the Call Queue software 123. Similarly, the circuit switched voice communication connection can alternatively be routed to an Interactive Voice Response system 114 and its associated IVR software 124 for initial customer contact data collection purposes. In lieu of a voice communication connection, the customer can initiate a document mode of communication via facsimile or paper document submission. A facsimile machine 108 can be used to convert a paper or electronic document into a data stream that is transmitted over a switched voice communication connection via the Public Switched Telephone Network to the switching fabric of PBX 113 of customer care center 100 for routing to FAX software 125. A paper document can be submitted directly to a corporate office or mailed to the mailroom of the customer care center 100 where the paper document is converted into a data stream via a document scanner 107 for routing to scanning software 126. The incoming call may require additional processing, such as by call controller 131 and call channel manager 132 in the case of a voice call or IVR controller 133 in the case of an IVR directed call. One alternative to a Public Switched Telephone Network processed communication connection is the Internet (Intranet) directed communication where the customer via their terminal device initiates a data communication with the web server 111 of customer care center 100 or transmits E-mail to E-Mail software 122 of customer care center 100.

In all of the above-noted instances, the customer initiates a communication connection to the customer care center 100 and the customer care center 100 must orchestrate all forms of work (voice calls, E-Mail, fax, image, web forms, and the like) relating to the servicing of customer requests across the entire communication system enterprise. This is accomplished by the use of a virtualization layer 204 that uses the web software 121, E-Mail software 122, Call Queue Software 123, IVR software 124, FAX software 125, scanning software 126, and the like to control the associated communication connections and provide data in a form that the next layer, the flow management layer 203 can utilize. The integrated work management engine 134 is the central element of the flow management layer 203 and brings together all types of disparate communication system components, applications and information storage systems so the business which provides the customer care can respond to their customer requests in a unified, efficient and effective manner. The integrated work management engine 134 also integrates the real time operation of the front office customer communications and the batch data processing mode of the back office. The integrated work management engine 134 provides a single "governance" engine that knows or can locate all necessary data about a customer.

The integrated Work Management Engine 134 accepts work through multiple access channels, where the channel can accept a work request in the form of voice calls, E-Mail, fax, image, web forms, and the like. Each work request arriving on a channel is automatically mapped to a one of the plurality of process flows 211 that specifies the task associated with the handling of the particular work item. The integrated Work Management Engine 134 uses resource selection algorithms of resource manager 135 and predictive work distributor 136 to select the customer agent who is best equipped to handle the next step of the work request where customer data is accessed, and customer case files are updated through the fulfillment process. The selected customer agent is connected with the customer via PBX 113 on a communication connection and can access the data storage and retrieval layer 202 to view the customer information in customer store 141, process information in process store 142, forms, work items in work item store 146 and performance statistics on their desktop terminal device through an API set that is tightly coupled to the integrated Work Management Engine 134. The system also provides management and reporting of the agent activity via customer store 141, process run store 142, system store 143, history store 145, resource store 147 to administrators 151, reporter software 152 and supervisors 154 via design and management layer 201. The design and management layer 201 also enables a system architect 153 to access process design store 144 to implement new and/or modified process maps 211.

The rules-based process maps 211 instantiate an integrated Work Management Engine 134 (in the more generic model) to enable the customer to provide data, either actively or passively, to define the optimal route through the customer care center 100 to obtain the services desired by this customer in a customer-specific manner. The rules-based process maps 211 collect data from the various elements used to implement the customer care center 100 and also provide data to regulate the operation of the customer care center elements by use of the integrated Work Management Engine 134.

Customer Care Center Philosophy

The customer care center processing of an incoming call to completion can be divided into three identifiable functions. The first function represents the segmentation phase where the customer care center identifies customers and determines a quality of service to be provided to this customer. The customer identity is typically determined via Automatic Number Identification data received from the central office that serves the customer and/or the use of an Interactive Voice Response system to collect data from the customer. The customer identity can also be determined from web information or scanned information from a facsimile transmission, and the like. The customer care center may also use the customer identity to compute a customer lifetime value, which is an indication of the value of this customer to the operator of the customer care center. The second function comprises resource selection, wherein the customer care center selects an agent from the pool of agents, using data from any of a number of sources to identify the service needed by the customer, such as data indicative of the dialed number (where the customer care center maintains a plurality of listed directory numbers for each of the various services provided), data from the Interactive Voice Response system indicative of a customer selection of a desired destination or desired service, and/or data from databases maintained in the customer care center indicative of the customer's previous interactions with the customer care center, which data can be used to extrapolate the customer's history to predict the service presently required. The identified service request is mapped to a selected agent in the pool of agents as a function of agent skill level, agent availability, customer value, and various other factors. Finally, the third function comprises a fulfillment phase wherein the customer is connected with a selected agent who performs requested function, using the agent's acquired and/or augmented skills. The execution of the final function includes the collection of data regarding the performance of the agent, which data is used to automatically update the agent's skill level. This data collection includes detecting trends in agent performance as well as the extrapolation of detected trends. Fulfillment can include many steps spanning a little or a lot of time, and involving multiple people and systems. The Integrated Work Management Engine coordinates all of this activity.

Integrated Work Management Engine

The Integrated Work Management Engine 134, as shown in FIG. 1, is the heart, brain and nerve center of the Fulfillment Framework. It interfaces with all other subsystems within the Fulfillment Framework and interfaces with other Integrated Work Management Engines in multi-site configurations. The main objective of the Integrated Work Management Engine is to bring together disparate systems, applications and information stores so that agents can respond to customer requests in a unified, efficient and effective manner. The Integrated Work Management Engine is responsible for the initiation and control of all workflow functions within the system, including both front-office "contact" functions and back-office "fulfillment" functions. The primary objective of the Integrated Work Management Engine is to allocate work to resources in a way that maximizes the effectiveness and efficiency of the entire enterprise and to meet the business objectives of the user.

The following requirements must be met to maximize the benefits and useful life of the Fulfillment Framework offer:

Multi-Vendor Support—To provide investment protection and to maximize options for new purchases, users must have the freedom to utilize communications equipment from any vendor, for example, database servers and enterprise software servers. The normalization of proprietary interfaces to communications servers is a key requirement.

Multi-Channel Support—The user's customers must be given free choice as to the channel they wish to use to obtain service, at any point in time. The abstraction of all media types into a normalized work item is another key requirement.

Platform Independence—To provide optimal price points, maximize scaleability and allow users to choose the best platform on which to run their mission critical customer care applications, the offer should be independent of any particular processor or operating system.

Integration of Business Data—Easy access to customer and business data stores of all types (including image) is essential to maximize effectiveness, eliminate 'corporate amnesia', and improve customer service, relationships and loyalty.

Information plug-ins that can access the data stores, and integrate with the software, of our best-in-class partners in the front-office application and back-office application markets are an essential requirement.

Primary Components of Integrated Work Management Engine

The Integrated Work Management Engine has the following primary components.
Workflow Manager 22
Work Distributor 23
Interfaces to Communications Subsystem
  Agent Desktop 21
  Data Management Subsystem 25
  Enterprise Applications 24
  Other Integrated Work Management Engines

Workflow Manager

The Workflow Manager 22 is the principal software component of the Integrated Work Management Engine 134. It has responsibility for the scheduling, sequencing and control of all contact and fulfillment tasks in the enterprise. The Workflow Manager 22 controls all active work items in the system and sequences those work items according to pre-administered process maps that define and execute the automated business processes of the user. At the point at which a work item completes a task and a new task is initiated that requires a system resource, the Workflow Manager 22 invokes the Work Distributor 23 to select the most appropriate system resource to meet the user's business objectives.

Work Distributor

The goal of the Work Distributor 23 is to allocate work items to resources in a fashion that maximizes all the business goals of the user. Advocate is an example of a workflow manager employed for the business, the customers and the agents, and sophisticated algorithms help resolve the sometimes conflicting objectives of these three participant communities.

Interfaces

Communications Subsystem Interfaces

The primary objective of this interface set is to provide a variety of different customer channels incorporating many media types and to abstract the customer contact into a normalized "work item" for processing.

Interfaces to Voice Servers

The primary objective is to abstract the proprietary nature of the different switches and their CTI protocols. Many CTI middleware solutions that achieve this objective exist, however, since each middleware solution exposes its own different API, a third layer is required that abstracts the various middleware solutions. This third layer has been named "CTI Above-Ware".

Call specific information captured by the Integrated Work Management Engine from incoming calls should be maximized and must, where available, include:

- Automatic Number Identification
- DNIS
- Collected digits
- CINFO digits (both CPD and CDPD)
- II digits

Interfaces to Interactive Voice Response Systems

The primary objective is to expose a single API for call monitoring and scripting control for Interactive Voice Response Systems. Since no standards or middleware solutions exists for Interactive Voice Response APIs, software modules must be written that run on each Interactive Voice Response platform that communicate via a proprietary protocol with a common API software module running on the Integrated Work Management Engine 134.

Agent Desktop Interfaces

The system must support both "push" and "pull" models for agents. In a "push" model, new work is delivered to the agent desktop under the control of the Integrated Work Management Engine 134. In a "pull" model, work is delivered by the Integrated Work Management Engine 134 to work lists serviced by one or more agents. Agents then receive work from those work lists by "pulling" the work under their own initiative or by an application "pulling" the work automatically on the agent's behalf and presenting the work to the agent.

It is anticipated that front office agents operate predominantly in the "push" model and that back office agents operate predominantly in the "pull" model. Regardless, the server must support both mechanisms for distributing work to agents.

Data Subsystem Interfaces

There are numerous potential interfaces to many different native and non-native data stores. The principal requirement of the Integrated Work Management Engine 134 is to select a standard data access technology that abstracts and normalizes the many different data formats and access mechanisms. Information plug-ins for accessing data objects in the data stores of our principal front-office and back-office partners are also a key requirement.

Interfaces to Other Integrated Work Management Engines

In the ideal world, data for multi-site routing decisions in the Integrated Work Management Engine 134 is simply obtained from the local Data Subsystem. Status information is passed by each Integrated Work Management Engine 134 to its local Data Subsystem and from there propagated to a central store or propagated or made accessible to all other Data Subsystems. This is architecturally correct, but as a model it is impractical. It is unlikely to meet the stringent time requirements necessary for the system to make quality routing decisions. Routing status information must be made available to all relevant Integrated Work Management Engines in the sub-second range and the architecture should be capable of supporting message passing between Integrated Work Management Engines that is consistently within the 200 milli-second range for time-sensitive routing messages. To ameliorate the impact of network latency and latency induced race conditions, multi-site request/command messages must include, where appropriate, caveats giving the remote system's understanding of the receiving system's state. To eliminate excessive network traffic and CPU degradation, filters must also be put in place for status update messages.

Only status changes that are viewed as significant should be allowed to pass through these filters.

Multi-Site Call Routing Architecture

Predictive or Post Route

Post-route architectures that are exclusively dependent on predictive data are not recommended. Although our predictive technology would provide excellent results for many of our users, the trend towards ever greater segmentation of contacts and the introduction of non-real-time media types lead to a lessening of the effectiveness of this approach. Architectures that make use of predictive technology but that are not dependent on it are recommended. Predictive technology should be used whenever applicable. It is required that the multi-site routing architecture be capable of assessing in real-time whether predictive technology is currently advantageous. The solution must dynamically use predictive technology when judged effective, and automatically fall back on non-predictive algorithms at other times.

Network-Routing

Support for a network routing capability is also required. The routing data used to drive the post-route operation should also be designed to be sufficient for network routing.

Objectives & Responsibilities

The main objective of the Integrated Work Management Engine is to bring together disparate systems, applications and information stores so that users can respond to customer requests in a unified, efficient and effective manner. The Integrated Work Management Engine is responsible for the initiation and control of all workflow functions within the system, including both front-office "contact" functions and back-office "fulfillment" functions. The primary objective of the Integrated Work Management Engine is to allocate work to resources in a way that maximizes the effectiveness and efficiency of the entire enterprise and to meet the business objectives of the user. Its successful implementation will play a key role in creating loyal relationships between users and their customers, by achieving a consistent and reliable quality of service and fulfillment to those customers.

Rules Engine and Rules Data

Figure 4:
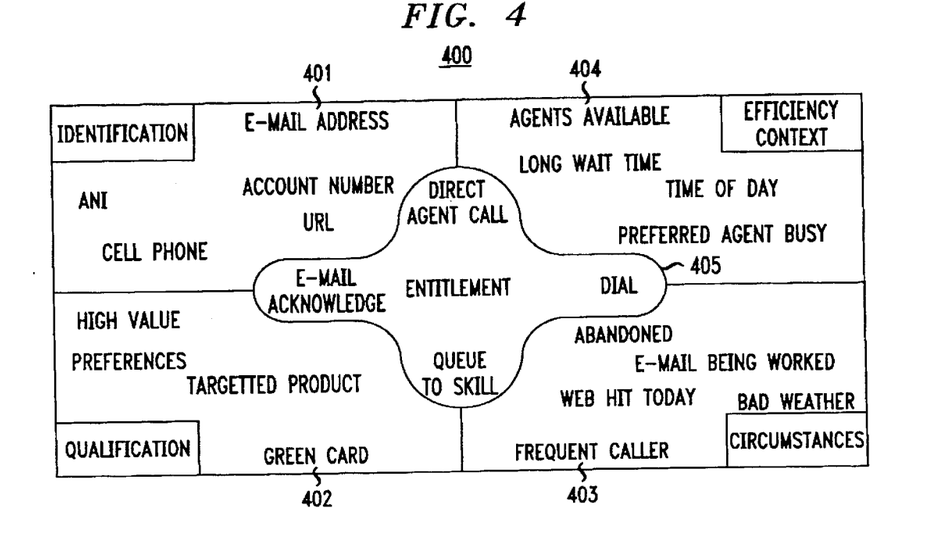
FIG. 4 illustrates in block diagram form the architecture of the integrated work management engine data for the call center example of FIG. 3 in the processing of a typical call connection.

FIG. 4 illustrates in block diagram form the architecture of the rules engine data 400 for the customer care center example of FIG. 1 in the processing of a typical call connection. In FIG. 4, the data 400 typically contained in the integrated work management engine 134 is divided into a number of categories. The first category is the Identification Data 401 that can be used to assist in the identification of the calling customer. This data represents the information that is available as a result of the calling customer creating a physical call connection to the customer care center system 100 via some selected communication medium, and is contained in the call context. This data can be caller identification if the calling customer is using a voice line connection from a telephone station set T1, or E-Mail address if accessing the system via a personal computer and a shared communication network such as an Intranet or the Internet. The second category of rules data comprises the Qualification Data 402 that identifies the importance of this calling customer to the operator of the customer care center 100. Thus, the customer identification data is used to access account information contained in the database 141 to provide further information that relates to the specific needs of this calling customer. Therefore, the calling customer can be identified as a "high value" customer based upon past volume of sales transactions and may also be identified as the recipient of special discount offers. The third category of rules data comprises Circumstances Data 403 that may impact on the processing of this call connection. Thus, the prior call activity for this calling customer may be an important indicator of the type of service that they should receive. The fourth category of rules data comprises the Efficiency Context Data 404 for the customer care center 100. This data relates to the present state of operation of the customer care center and provides an indication of length of queue, status of preferred agents, which agent would be best adapted to process this call, and the like. Finally, the fifth category of rules data comprises the Entitlement Data 405 that defines the type of call processing that is appropriate or preferred for this specific calling customer. Thus, the calling customer may prefer personalized service from an agent rather than a voice response system, or the calling customer may prefer immediate service. In addition, an any media call instance can be processed where for example the customer initiates a voice call and desires an E-Mail response order confirmation. These categories of rules data are maintained in the integrated work management engine 134 to enable the system to efficiently process the calling customer's call connection.

Call Routing via Rules Based Process

Figure 5:
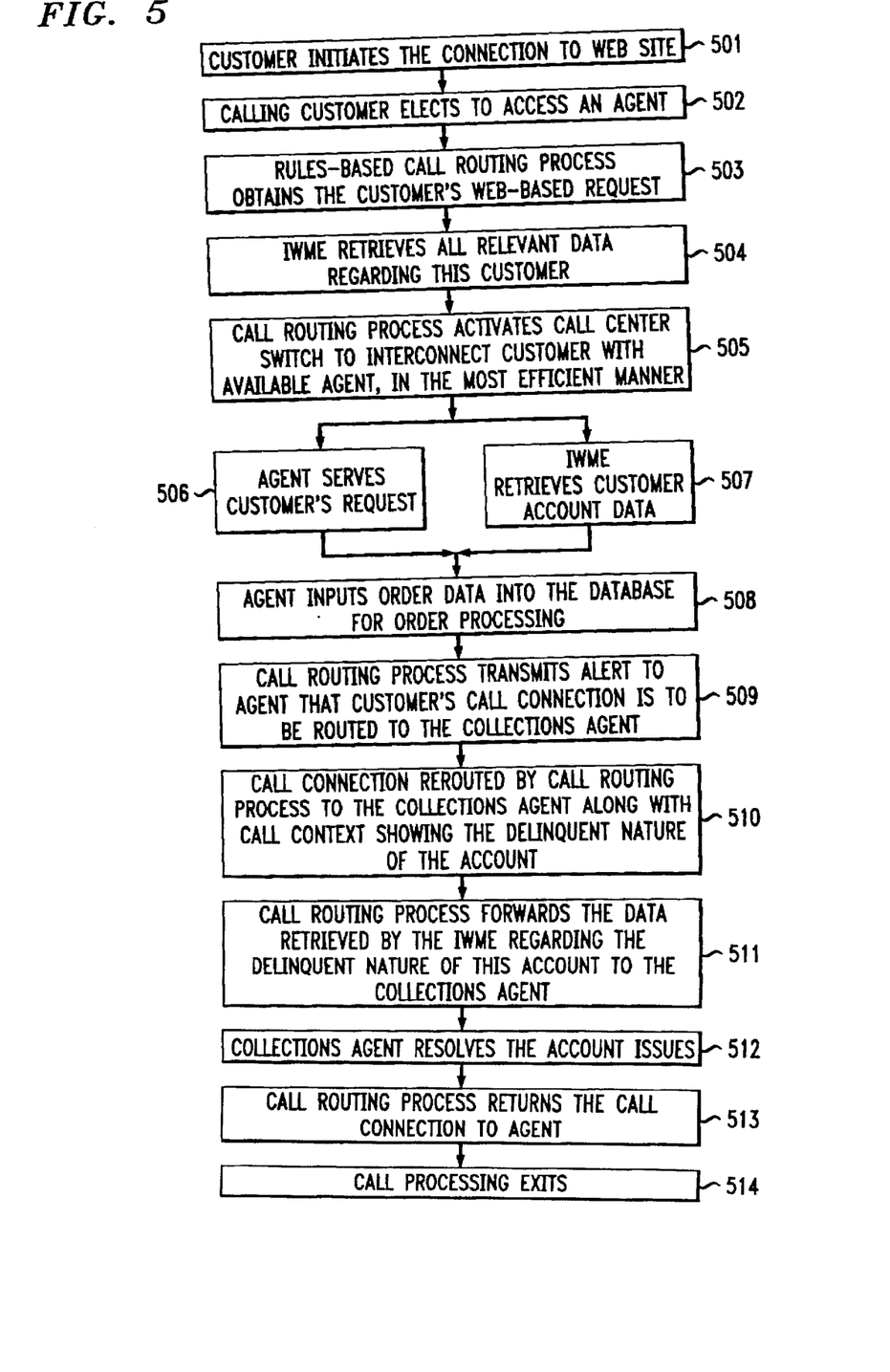
FIG. 5 illustrates in flow diagram form the processing of a typical call connection through the system.

FIG. 5 illustrates in flow diagram form the processing of a typical call connection through this system. The customer initiates the call connection at step 501 from a personal computer which the user connects to the call center operator's web site via an Asynchronous Transfer Mode (ATM) communication connection. The web site is managed by the web server 111 which functions to present the web page images, transmit same to the customer and respond to customer provided input to redirect the customer to the information requested by the customer. Typically, the web server 111 cycles the customer through a plurality of screen displays as the user navigates through the web site and its plurality of information choices provided by the web server 111. In addition, the web server 111 functions to collect data relating to the identity of the calling customer and any other customer related data that can be used to process this call in the proper context. The collected data is transmitted at step 503 described below by the web server 111 to the integrated work management engine 134 for inclusion in the rules data portion of the integrated work management engine 134.

Figure 3:
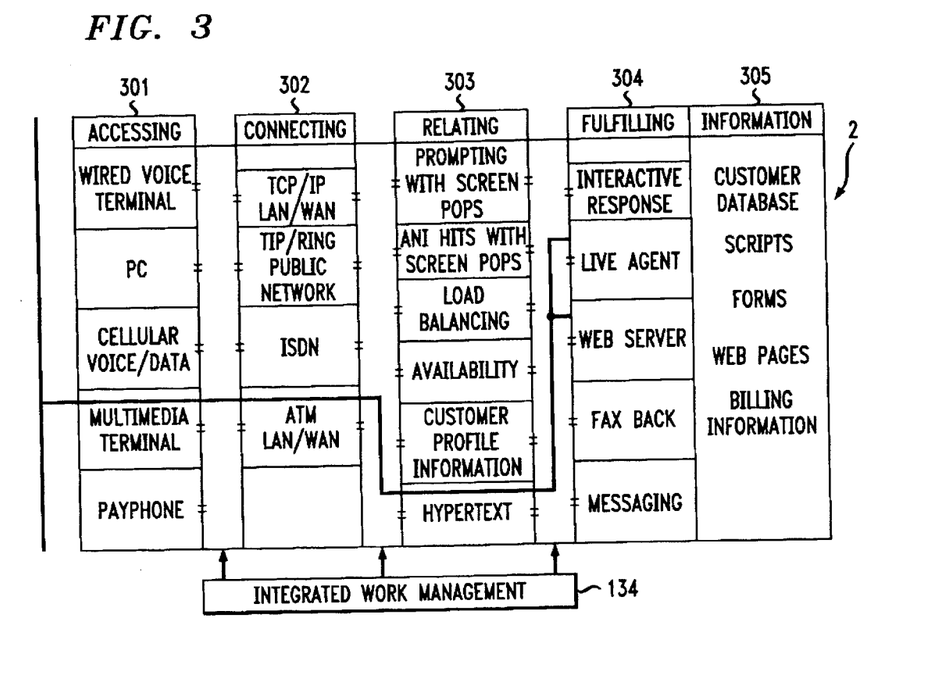
FIG. 3 illustrates in block diagram form an embodiment of a call center architecture that uses a rules-based call management paradigm.

The processing of the initial connection for this calling customer comprises the call connection entering the Accessing Layer 201 of FIG. 3 via the Multi-Media Terminal category and receiving a point of presence on the customer care center system 100 by the rules engine 300 providing an ATM trunk slot on the local area network, which comprises the ATM LAN/WAN category of the Connecting Layer 302 of FIG. 3. The integrated work management engine 134 performs a relationship building function, which comprises a layer of functionality that is overlaid on the connectivity layer. In the relationship building function, the mode of communication that is deemed appropriate by the integrated work management engine 134 for this type of access is the hypertext category of the Relating Layer 303, which interconnects the web server category of Fulfilling layer 303 with the calling customer. The web server 111 thus fulfills the customer request and the hypertext is used to learn more about this customer to thereby enable the customer care center 100 to more effectively serve the customer. The web server category has an embodiment in FIG. 3 as web server 111, which has access to a predefined series of web pages that comprise web site software, which comprise a portion of the Information Layer 305. As this call connection is processed, temporary connections are established among the various layers 301–305 and various categories of these layers 301–305 to exchange call context data among the various participants in the call connection.

For the purpose of this description, assume that the calling customer, via the various selections available on a web page presented by the web server 111, elects to access an agent within the customer care center 100. This is accomplished by the user clicking on a selected icon on the display produced as part of a web page transmitted to the calling customer by the web server 111 at step 502 which prompts the web server 111 to redirect the communication connection from the web server 111 to the call center gateway 203 which functions as a gateway for communication connection routing. The call center gateway 203 communicates with the rules-based call routing process in the Integrated Work Management Engine to direct this communication connection to an appropriate destination. The rules-based call routing process of the Integrated Work Management Engine 134 at step 503 obtains data relating to the customer (Information Layer 305) as part of the communication connection redirection. In particular, the identity of the customer, the particular pages presented at the web site that were accessed by the customer, the duration of these accesses, customer query information input to the web server 111 by the customer as part of the web site access, and the like are transmitted from the web server 111 to the rules-based call routing process of the Integrated Work Management Engine 134. Thus, the call context data that is associated with this customer's access to the customer care center 100 via the web server 111 is retained and passed along with the customer's communication connection to the next link in the call connection. The rules-based call routing process of the Integrated Work Management Engine 134 prequalifies this call by generating a customer profile and redirecting the communications connection to a selected category of the Fulfilling Layer 304 in the customer care center 100 based upon the customer-indicated preferences and passively collected customer data. For the selected example, the rules-based call routing process of the Integrated Work Management Engine 134 must route the calling customer to a live agent for the processing of this call connection. The routing is processed in the context of the calling customer using data that was collected on the web, rather than as an anonymous incoming call.

SUMMARY

Thus, the present media independent communications processing system implements a rules-based call routing process that utilizes the identity of the calling party, the call context and any media content of a communication connection to effect routing the call to a destination that is appropriate to the call in terms of any media communications capabilities and information content, in a manner heretofore unknown in call processing. This rules-based call routing process also maximizes the call center efficiency and agent productivity.

What is claimed:

1. A work management system, operational in a communication service providing system, for interconnecting a customer, who is using a communication device, in a communication session with a selected one of a plurality of agents that are connected to said communication service providing system, comprising:

means, responsive to establishment of a communication connection with a customer, for retrieving data relating to said customer to create a call context indicative of characteristics of said customer and said communication session, including a definition of the media form of said communication session;

means for mapping a work request receives from said customer to a process flow that defines a task associated with the handling of said work request;

means, responsive to said call context, for establishing a communication connection through said communication service providing system to a selected one of said plurality of agents; and means for providing said selected agent with data from at least one of a plurality of customer service data sources including: customer information, process information, forms, and performance statistics.

2. The work management system of claim 1 wherein said means for establishing comprises:

means for integrating real time operation of customer communications and batch data processing mode of said plurality of customer service data sources.

3. The work management system of claim 1 wherein said means for establishing comprises:

means for integrating work requests received from said customer from any of a plurality of access channels, where said access channels accept a work request in at least one of a plurality of forms, including: voice calls, E-Mail, fax, image, web forms, and the like.

4. The work management system of claim 3 wherein said means for establishing further comprises:

means for automatically mapping each work request arriving on one of said plurality of access channels to a process flow that specifies the task associated with the handling of the particular work item.

5. The work management system of claim 4 wherein said means for providing comprises:

means for using resource selection algorithms to select a one of said plurality of agents best equipped to handle the next step of said work request.

6. The work management system of claim 5 wherein said means for providing further comprises:

means for dynamically updating customer case files where customer data is accessed.

7. The work management system of claim 1 wherein said means for establishing comprises:

means for rules based call routing using said context information to assist in the call navigation to said selected one of said plurality of agents.

8. The work management system of claim 7 wherein said means for rules based call routing comprises:

means, responsive to data generated in said call session, for transferring said communication connection to another of said plurality of agents; and means for forwarding said call context to said another of said plurality of agents.

9. A method of operating a work management system, operational in a communication service providing system, for interconnecting a customer, who is using a communication device, in a communication session with a selected one of said plurality of agents that are connected to said communication service providing system, comprising the steps of:

retrieving, in response to establishment of a communication connection with a customer, data relating to said customer to create a call context indicative of characteristics of said customer and said communication session, including a definition of the media form of said communication session;

mapping a work request received from said customer to a process flow that defines a task associated with the handling of said work request;

establishing, in response to said call context, a communication connection through said communication service providing system to a selected one of said plurality of agents; and providing said selected agents agent with data from at least one of a plurality of customer service data sources including: customer information, process information, forms, and performance statistics.

10. The method of operating a work management system of claim 9 wherein said step of establishing comprises:

integrating real time operation of customer communications and batch data processing mode of said plurality of customer service data sources.

11. The method of operating a work management system of claim 9 wherein said step of establishing comprises:

integrating work requests received from said customer from any of a plurality of access channels, where said access channels accept a work request in at least one of a plurality of forms, including: voice calls, E-Mail, fax, image, web forms, and the like.

12. The method of operating a work management system of claim 11 wherein said step of establishing further comprises:

automatically mapping each workrequest arriving on one of said plurality of access channels to a process flow that specifies the task associated with the handling of the particular work item.

13. The method of operating a work management system of claim 12 wherein said step of providing comprises:

using resource selection algorithms to select one of said plurality of agents best equipped to handle the next step of said work request.

14. The method of operating a work management system of claim 13 wherein said step of providing further comprises:

dynamically updating customer case files where customer data is accessed.

15. The method of operating a work management system of claim 9 wherein said step of establishing comprises:

rules based call routing using said context information to assist in the call navigation to said selected one of said plurality of agents.

16. The method of operating a work management system of claim 15 wherein said step of rules based call routing comprises:

transferring, in response to data generated in said call session, said communication connection to another of said plurality of agents; and forwarding said call context to said another of said plurality of agents.

17. A work management system, operational in a communication service providing system, for interconnecting a customer, who is using a communication device, in a communication session with a selected one of a plurality of agents that are connected to said communication service providing system, comprising:

customer characterization means, responsive to establishment of a communication connection with a customer, for retrieving data relating to said customer to create a call context indicative of characteristics of said customer and said communication session, including a definition of the media form of said communication session;

work management engine means for mapping a work request received from said customer to a process flow that defines a task associated with the handling of said work request;

switching means, responsive to said call context, for establishing a communication connection through said communication service providing system to a selected one of said plurality of agents; and data management means for providing said selected agent with data from at least one of a plurality of customer service data sources including: customer information, process information, forms, and performance statistics.

18. The work management system of claim 17 wherein said switching means comprises:

data flow management means for integrating real time operation of customer communications and batch data processing mode of said plurality of customer service data sources.

19. The work management system of claim 17 wherein said switching means comprises:

work item integration means for integrating work requests received from said customer from any of a plurality of access channels, where said access channels accept a work request in at least one of a plurality of forms, including: voice calls, E-Mail, fax, image, web forms, and the like.

20. The work management system of claim 19 wherein said switching means further comprises:

process map means for automatically mapping each work request arriving on one of said plurality of access channels to a process flow that specifies the task associated with the handling of the particular work item.

21. The work management system of claim 20 wherein said data management means comprises:

agent selection means for using resource selection algorithms to select a one of said plurality of agents best equipped to handle the next step of said work request.

22. The work management system of claim 21 Wherein said data management means further comprises:

data update means for dynamically updating customer case files where customer data is accessed.

23. The work management system of claim 17 wherein said switching means comprises:

process map means for rules based call routing using said context information to assist in the call navigation to said selected one of said plurality of agents.

24. The work management system of claim 23 wherein said process map means comprises:

call redirection means, responsive to data generated in said call session, for transferring said communication connection to another of said plurality of agents; and data forwarding means for forwarding said call context to said another of said plurality of agents.

* * * * *